United States Patent [19]
Igwe

[11] 3,782,671
[45] Jan. 1, 1974

[54] CAMERA MOUNT

[76] Inventor: Godwill M. Igwe, 180 Queen Mary Rd., Apt. 708, Kingston, Ontario, Canada

[22] Filed: June 16, 1972

[21] Appl. No.: 263,550

[52] U.S. Cl. ............... 248/183, 95/86, 248/187
[51] Int. Cl. ............................................ F16m 11/12
[58] Field of Search ............... 248/183, 187, 184, 248/185, 178, 179; 95/86

[56] References Cited
UNITED STATES PATENTS

| | | |
|---|---|---|
| 1,425,807 | 8/1922 | Thalhammer ............... 248/187 X |
| 1,898,469 | 2/1933 | Tonsor ............... 248/183 |
| 2,419,887 | 4/1947 | Alisse ............... 248/183 X |
| 2,555,638 | 6/1951 | Fishter ............... 248/183 |
| 2,832,556 | 4/1958 | Jonson ............... 248/183 |

*Primary Examiner*—J. Franklin Foss
*Attorney*—Peter W. McBurney et al.

[57] ABSTRACT

A camera mount includes a camera mounting surface onto which the mounting fitting of the camera may be locked or from which it may be released by projection and retraction of a threaded spindle by use of a novel gearing arrangement.

8 Claims, 5 Drawing Figures

CAMERA MOUNT

This invention relates to camera mounts, more particularly to camera mounts having improved and simplified operation.

Camera mounting devices of many types are known. Such devices are utilized to mount a camera relative to a tripod or other stabilizing structure while allowing the camera to be locked in a plurality of positions relative to the tripod and to be moved to varying positions relative to the tripod.

A standard fitting is provided on the base of most cameras to allow the camera to be attached to a mounting device. The fitting includes a threaded bore extending therein and the bore is intended to engage and mesh with a threaded spindle projecting from the mounting device.

The present invention provides a simple, ready and effective manner of achieving the enmeshing of the threaded bore and spindle.

The invention is described by way of illustration with reference to the accompanying drawings, in which.

Figure 1:
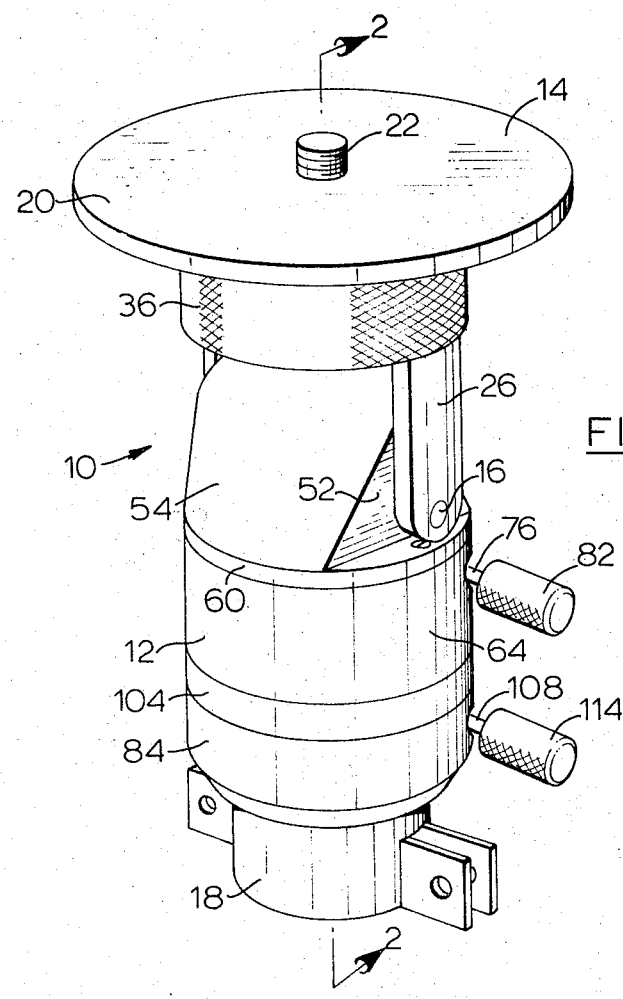
FIG. 1 is a perspective view of a camera mount according to the present invention.
Figure 3:
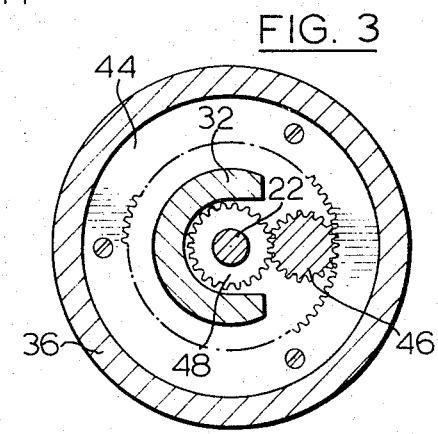
FIG. 3 is a sectional view taken along line III—III of FIG. 2.
Figure 4:
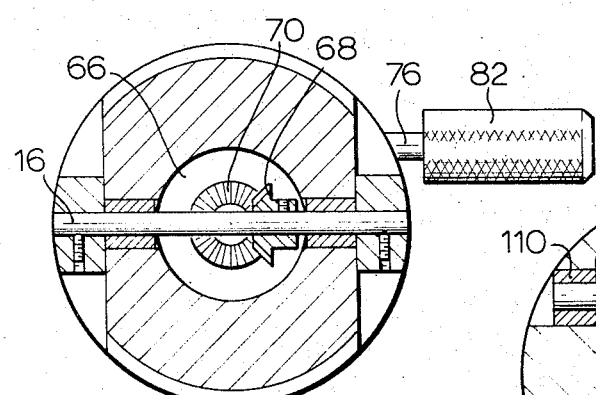
FIG. 4 is a sectional view taken along line IV—IV of FIG. 2.

Referring to the drawings a camera mount 10 includes a base 12 and a head 14. The head 14 is mounted on the base 12 and is capable of pivotal movement relative thereto about pivot pin 16, the pivot pin 16 thereby constituting a horizontal axis about which the head 14 may rotate. The base 12 includes a clip 18 for attachment of the mount in known manner to a tripod or other stabilizing structure. The clip 18 may be replaced by any other convenient mounting means, for example, a threaded opening. The head 14 has a planar camera mounting surface 20 on which the camera is mounted. The mounting surface 20 is substantially circular, although any convenient shape may be employed.

A retractable spindle 22 is positioned at the centre of the mounting surface 20 and is movable substantially perpendicularly of the surface 20. The spindle 22 has a threaded outer surface which meshes with complimentary threads in an opening 24 in the mounting surface 20, so that the spindle 22 may be moved perpendicularly to the surface 20 while the surface 20 is stationary and at the same time supports the spindle 22.

The head 14 includes a pair of arms 26 which extend from the pivot pin 16 towards the mounting surface 20 and terminate in a disc 28 which is located in a plane parallel to and spaced from that of the surface 20. Fixedly mounted to the disc 28 on the opposite side from the arm 26 is a circular abutment 30 which includes an arcuate flange 32 projecting upwardly therefrom to engage and be secured to the undersurface 34 of the mounting surface 20.

A hollow cylindrical ring 36 having an outside diameter substantially that of the disc 28, although other relative dimensions may be employed, is positioned and extends between the disc 28 and the mounting surface 20, the axis of the cylinder being the axis of the spindle 22.

The cylindrical ring 36 is in touching engagement with the upper surface of the disc 28 and the undersurface 34 of the mounting surface 20, and the engaging surfaces may move relative to each other.

The cylindrical ring 36 has an annular shoulder 38 which forms part of an annular flange 40 integral with the inner wall of the cylinder 36. The annular flange 40 has a vertical depth substantially that of the abutment 30 and positioned between the outer peripheral surface of the abutment 30 and the inner surface of the flange 40 are bearings 42 of any convenient construction, whereby the ring 36 may be rotated relative to the stationary abutment 30.

A ring gear 44 is fixedly mounted on the shoulder 38 and has teeth on its radially inner surface. Since the ring gear 44 is thus mounted, it is concentric with the cylindrical ring 36 and hence is rotatable about the axis of the spindle 22. The teeth of the ring gear 44 mesh with teeth in the outer surface of a pin gear 46 which is mounted for rotation in the undersurface 34 of the mounting surface 20.

A gear wheel 48, constituting a third gear, is fixedly mounted on the lower end of spindle 22 and meshes with the teeth pin gear 46. The form of the threads on the surface of the spindle 22 and the inner wall of the opening 24 and the teeth of the gear wheel 48 are such that rotation of the pin gear 46 causes the gear wheel 48 to rotate and translate along the surface of the pin gear 46, thereby causing the spindle 22 to be projected or retracted depending on the direction of rotation of the gear wheel.

Upon rotation of the cylindrical ring 36 about its axis, the motion causes rotation of the pin gear 46 by the enmeshing of the teeth of the ring gear 44 with the pin gear 46, which in turn causes rotation and axial movement of the spindle 22.

If the spindle 22 is in a retracted position in which substantially all of the length thereof is located below the level of the mounting surface 20 and a camera is located with the camera body mounting fitting over the opening, then upon rotation of the ring 36 in the appropriate direction the spindle 22 moves axially outwardly first to engage the threads of the bore of the fitting and then to mesh therewith so that the camera is locked to the mounting surface 20.

The base 12 includes an upper portion 50 to which is attached the head 14. The attachment is achieved by the pivot pin 16 which is fixedly mounted to the arms 26 and passes through the opposed upright walls 52 of the upper portion 50. The pivot pin 16 journalled in bearings 54 in the walls 52 and hence the head 14 may pivot relative to the base 12 about the pivot pin 16.

The upper portion 50 has a top closure 56 which defines with the walls 52 an enclosed chamber 58. The walls 52 of the upper portion 50 are secured by annular flange 60 to an external upper surface 62 of a cylindrical element 64. The cylindrical element 64 includes a hollowed-out portion 66 in which is received gearing elements, as discussed below. The cylindrical element 64 has an outside diameter substantially that of the ring 36, although other relative dimensions may be employed.

Fixedly mounted to the pivot pin 16 is a first bevel gear 68 which meshes with a second bevel gear 70 which is fixedly mounted on an axle 72. The axle 72 is mounted on the axis of cylindrical element 64 and is journalled for rotation relative thereto by bearing 74.

Figure 5:
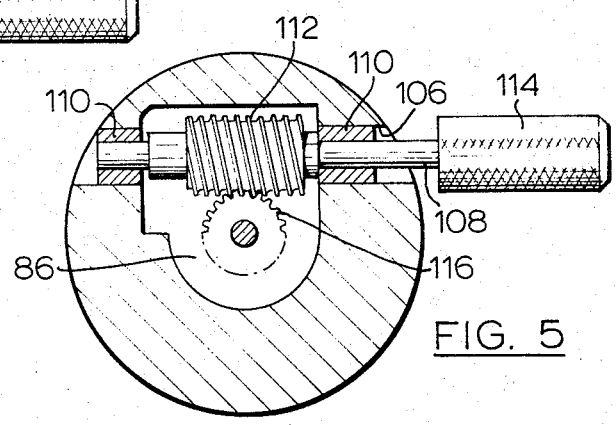
FIG. 5 is a sectional view taken along line V—V of FIG. 2.
Figure 2:
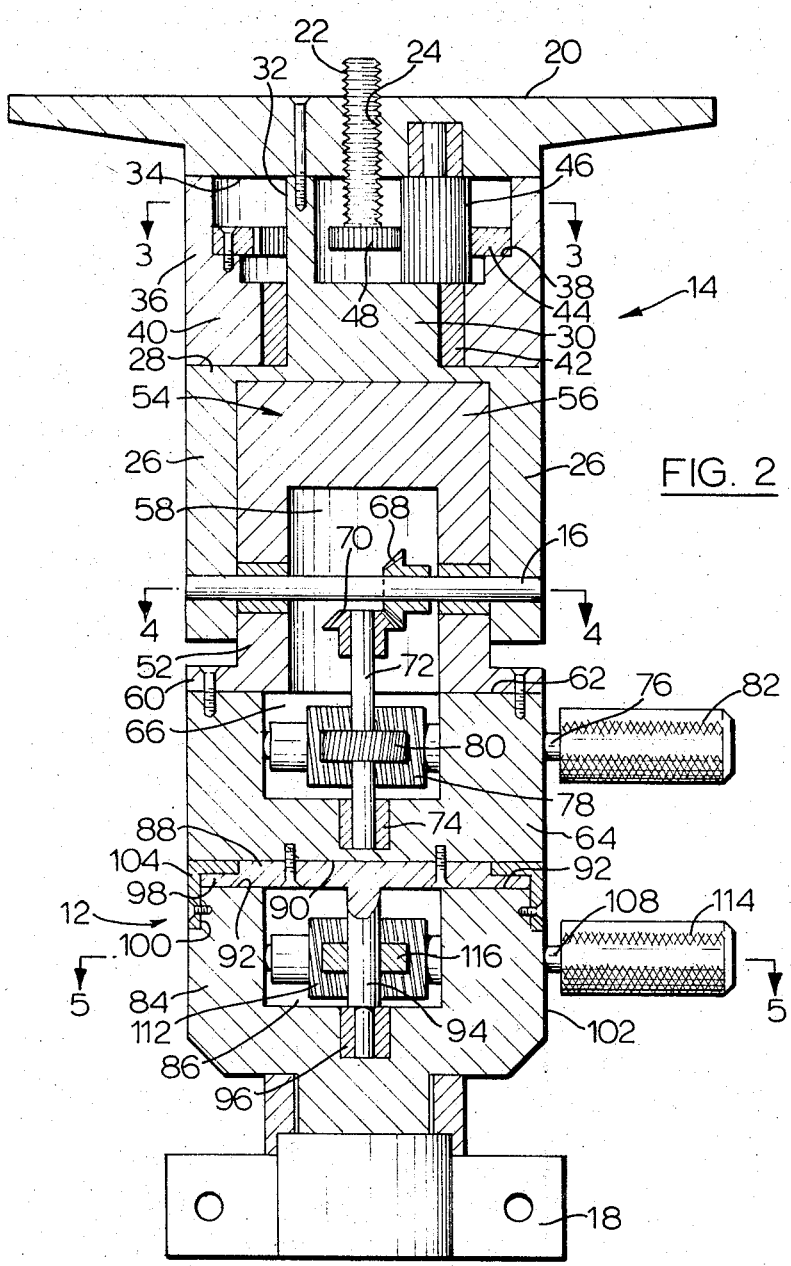
FIG. 2 is a sectional view of the camera mount of FIG. 1 taken along line II—II.

A passageway (not shown but is equivalent to that discussed below in connection with FIG. 5) is formed through the wall of the element 64 communicating with the hollowed-out portion 66. An axle 76 passes through the passageway and is journalled for rotation relative thereto. The axle 76 has a terminal portion within the hollowed-out portion 66 on which is fixedly mounted a gear element 78. The gear element 78 meshes with a gear element 80 fixedly mounted on the axle 72.

The axle 76 has a terminal portion outside the cylindrical element 64 to which affixed a turning knob 82. Upon rotation of the knob 82, the rotative motion of the axle 76 causes the axle 72 to rotate under the action of the meshed gears 78 and 80 and hence the pivot pin 16 is rotated. In this way, the head 14 may be moved relative to the base 12 in a vertical plane about a substantially horizontal axis, so that any desired attitude of the camera mounted on the mounting surface 20 relative to the horizontal axis of the pivot pin 16 may be achieved. The gears 78 and 80 are such that upon ceasing to rotate the axle 76 the head 14 is temporarily locked in its position relative to the base 12.

The above-described gearing arrangement represents one manner in which it is possible to achieve movement of the head relative to the base about a substantially horizontal axis, and other convenient arrangements may be employed.

The base 12 includes a further cylindrical element 84 to which is attached at the lower face thereof the clip 18. The cylindrical element 84 includes a hollowed-out portion 86 (see FIG. 5) in which are located gearing elements as discussed below. The outside diameter of the cylindrical element 84 is substantially that of the cylindrical element 64 to provide a pleasing external appearance, although other relative diameter may be used, if desired.

A circular disc 88 is attached to the external lower surface 90 of the cylindrical element 64 and engages the upper external surface 92 of the cylindrical element 84. The disc 88 has a spindle 94 extending from the lower face thereof into the hollowed-out portion 86 and is journalled in bearing 96 so that the disc 88 is rotatable relative to the cylindrical element 84.

The disc 88 at the periphery thereof has an annular area 98 of reduced thickness. The cylindrical element 84 adjacent the upper surface 92 has an annular shoulder 100 in the outer wall 102. An annular L-shaped bracket 104 is positioned in engagement with the shoulder 100 and with the outer wall 102 in the region of the shoulder and is secured to the element 84. The bracket 104 also is positioned in engagement with the annular area 98 of the disc 88. In this way the disc 88 is positioned relative to the cylindrical element 84, but is free to rotate about the axis of the element 84.

A passageway 106 is formed through the wall 102 of the cylindrical element 84 in communication with the hollowed-out portion 86. An axle 108 is journalled for rotation in the passageway 106 by bearings 110 and has a gear element 112 fixedly mounted thereon at the extremity thereof within the hollowed-out portion 86. A knob 114 is fixedly attached to the extremity of the axle 108 external of the cylindrical element 84.

The spindle 94 has fixedly mounted thereon a gear element 116 which meshes with gear element 112, so that upon rotation of the knob 114, the spindle 94 is rotated about the axis of the element 84 through the intermesh of the gears 112 and 116. In this wall the disc 88, and hence the cylindrical element 64 is rotated about the axis of the spindle 94. Therefore, it is possible by rotation of the knob 114 to rotate the whole of the head 14 about a substantially vertical axis of rotation, which is the axis of the base 12. The gear elements 112 and 116 are such that upon termination of rotation of knob 114 a temporary lock is provided.

This arrangement of gears represents one way in which rotative motion about the vertical axis of the base 12 may be achieved. Any other convenient arrangement may be utilized.

In this way it is possible by the present invention to provide a camera mount which is readily and easily adjustable to an infinite number of positions relative to vertical and horizontal axes of rotation.

The base 12 is illustrated as formed of a plurality of elements of circular cross-section of substantially the same diameter. Any other convenient cross-sectional shape may be employed and differing dimensioned elements may be used.

Modifications are possible within the scope of the invention.

What I claim is:

1. A camera mounting device including a base member and a head member attached to said base member, said head member including a planar camera mounting surface, a retractable spindle having a threaded external surface meshing with a complimentary threaded opening in said mounting surface, said spindle being movable between a retracted position wherein substantially all of said spindle is located below the plane of said mounting surface and internally of said head and a fully extended position projecting substantially perpendicular to the plane of said mounting surface wherein a substantial proportion of said spindle projects out of the plane of said mounting surface while a proportion is maintained in engagement with the threaded opening of said surface, said spindle during movement between said positions being capable of engaging and meshing with complimentary threads of camera to be mounted on said surface, first gear means mounted on the underside of said mounting surface internally of said head for rotation about an axis substantially parallel to that of said spindle, ring gear means meshing with said first gear means and mounted for rotation relative to said mounting surface about the axis of said spindle, third gear means fixedly mounted to said spindle and meshing with said first gear means in translational manner, whereby upon rotation of said ring gear means the motion imparted thereby to said first gear means causes the third gear means to rotate and to translate along the surface of said first gear means, thereby to move said spindle between said retracted and fully extended positions.

2. The device of claim 1 wherein said camera mounting surface is circular and the axis of said spindle passes through the centre of said circle.

3. The device of claim 2 wherein said spindle is movable perpendicularly of said camera mounting surface.

4. The device of claim 2 wherein said ring gear is fixedly mounted on the internal wall of a hollow cylindrical ring element, said ring element having a vertical axis coinciding with the axis of said spindle.

5. The device of claim 1 wherein said head member is pivotally mounted relative to said base member for pivotal movement about a substantially horizontal axis, and said head member includes a disc having arm projecting downwardly therefrom and terminating in opposite ends of a horizontal pivot pin pivotally connecting said head member to said base member, an abutment secured to the upper surface of said disc and having a flange extending upwardly and attached to the underside of said mounting surface, said mounting surface being circular, and a hollow cylindrical ring element extending between said disc and the underside of said mounting surface and being rotatable about the axis thereof relative thereto, the axis of said ring element passing through the centre of the circle of the mounting surface, said ring element enclosing said abutment and said flange and the inner wall of said ring element being spaced from said abutment, said ring gear means being fixedly mounted on the inner wall of said ring element and the axis of said spindle passes through said circle of the mounting surface.

6. The device of claim 1 including means for pivoting said head member relative to said base member about a substantially horizontal axis and means for rotating said base member about a substantially vertical axis.

7. The device of claim 6 wherein said head member is mounted on a horizontal pivot pin for pivotal movement relative to said base member about said axis, and said means for pivoting said head member relative to said base member includes a first bevel gear fixedly mounted on the pivot pin, a second bevel gear meshing with said first bevel gear and fixedly mounted on an axle mounted perpendicularly to said pivot pin and means for rotating said axle about its axis, and said means for rotating said base member about a vertical axis includes a stationary element and a rotatable element, spindle means fixedly mounted on said rotatable element and journalled for rotation relative to said stationary element, and means to rotate said spindle means.

8. The device of claim 7 wherein said base member is cylindrical and includes hollowed-out sections in which are located said axle and said spindle means, said means for rotating said axle includes fourth gear means fixedly mounted on said wall, fifth gear means meshing with said fourth gear means and fixedly mounted on a first spindle projecting through the external wall of said base member into one of said hollowed-out portions and first knob means on the latter spindle, and said means for rotating said spindle means includes sixth gear means fixedly mounted on said spindle means, seventh gear means meshing with said sixth gear means and fixedly mounted on a second spindle projecting through the external wall of said base member into another of said hollowed-out portions and second knob means on the latter spindle.

* * * * *